(12) United States Patent
Heuer et al.

(10) Patent No.: US 9,888,093 B2
(45) Date of Patent: Feb. 6, 2018

(54) METHOD AND APPARATUS FOR PROVIDING A SERVICE IMPLEMENTATION

(75) Inventors: Jörg Heuer, Oberhaching (DE); Sebastian Käbisch, München (DE); Daniel Peintner, Meransen Muehlbach (IT)

(73) Assignee: SIEMENS AKTIENGESELLSCHAFT, Munich (DE)

(*) Notice: Subject to any disclaimer, the term of this patent is extended or adjusted under 35 U.S.C. 154(b) by 932 days.

(21) Appl. No.: 13/697,816

(22) PCT Filed: Apr. 26, 2011

(86) PCT No.: PCT/EP2011/056565
§ 371 (c)(1),
(2), (4) Date: Dec. 13, 2012

(87) PCT Pub. No.: WO2011/144422
PCT Pub. Date: Nov. 24, 2011

(65) Prior Publication Data
US 2013/0110914 A1    May 2, 2013

(30) Foreign Application Priority Data
May 17, 2010  (EP) .................... 10005132
Oct. 11, 2010  (EP) .................... 10187130

(51) Int. Cl.
*G06F 15/16*    (2006.01)
*H04L 29/06*    (2006.01)
(Continued)

(52) U.S. Cl.
CPC ............... *H04L 67/42* (2013.01); *G06F 8/35* (2013.01); *G06F 9/54* (2013.01); *G06F 17/30595* (2013.01)

(58) Field of Classification Search
CPC . H04L 12/5855; H04L 12/5895; H04L 51/14; H04L 65/4084; H04L 65/605;
(Continued)

(56) References Cited

U.S. PATENT DOCUMENTS 5,136,290 A * 8/1992 Bond .................... H03M 7/425
                                                    341/106
6,711,740 B1 * 3/2004 Moon et al. .................. 719/328
(Continued)

FOREIGN PATENT DOCUMENTS

WO   2011/144422 A1   11/2011   ............... G06F 9/44

OTHER PUBLICATIONS

Compressing SOAP Messages by using Pushdown Automata by Christian Werner (Published by 2006).*
(Continued)

*Primary Examiner* — Kevin Bates
*Assistant Examiner* — Ronak Patel
(74) *Attorney, Agent, or Firm* — Slayden Grubert Beard PLLC

(57) ABSTRACT

A method for providing a web service may include generating an XML-based schema based on a service description of said web service, which generated XML-based schema defines XML-based messages to be interpreted by the respective web service, generating a binary XML processor code for encoding and decoding said XML-based messages based on the generated XML based schema, transforming said service description of said web service into a procedure skeleton code comprising one or more skeleton procedures each becoming an application procedure by implementing an application logic for the respective skeleton procedure, and generating a dispatcher code based on the service description, said dispatcher code configured to interpret a byte stream produced by said binary XML processor code to
(Continued)

invoke one of the implemented application procedures. This provides an innovative approach to generate source code for developing XML-based web services for small embedded devices with constraint resources.

15 Claims, 2 Drawing Sheets

(51) Int. Cl.
  *G06F 9/44*     (2006.01)
  *G06F 9/54*     (2006.01)
  *G06F 17/30*    (2006.01)

(58) Field of Classification Search
  CPC ..... H04L 67/02; H04L 67/04; H04L 67/2804; H04L 67/2819; H04L 67/2823; H04L 67/42; H04L 69/04
  USPC ........................................................ 709/203
  See application file for complete search history.

(56) References Cited

U.S. PATENT DOCUMENTS

| | | | | |
|---|---|---|---|---|
| 6,883,137 | B1* | 4/2005 | Girardot | H03M 7/30 380/269 |
| 7,028,312 | B1* | 4/2006 | Merrick | G06F 9/547 709/203 |
| 7,188,158 | B1 | 3/2007 | Stanton et al. | 709/220 |
| 7,233,953 | B2* | 6/2007 | Heuer | H04N 21/235 |
| 7,500,017 | B2* | 3/2009 | Cseri | G06F 17/218 341/106 |
| 7,945,893 | B2* | 5/2011 | Angrish | G06F 9/547 717/106 |
| 8,566,356 | B2* | 10/2013 | Lusk | H04L 67/42 707/791 |
| 2002/0138517 | A1* | 9/2002 | Mory | H03M 7/30 715/227 |
| 2004/0013307 | A1* | 1/2004 | Thienot | H04N 19/25 382/232 |
| 2004/0109501 | A1* | 6/2004 | Wollborn | H04N 19/25 375/240.08 |
| 2004/0143791 | A1* | 7/2004 | Ito | G06F 17/2247 715/234 |
| 2005/0144556 | A1* | 6/2005 | Petersen | H03M 7/30 715/242 |
| 2005/0182778 | A1* | 8/2005 | Heuer | G06F 17/2247 |
| 2005/0193408 | A1* | 9/2005 | Sull et al. | 725/32 |
| 2005/0273772 | A1* | 12/2005 | Matsakis | G06F 8/41 717/136 |
| 2005/0278616 | A1* | 12/2005 | Eller | G06F 17/2258 715/234 |
| 2006/0129689 | A1* | 6/2006 | Ho | H04L 69/04 709/230 |
| 2006/0253465 | A1* | 11/2006 | Willis | G06F 17/2247 |
| 2006/0265489 | A1* | 11/2006 | Moore | H04L 69/40 709/223 |
| 2008/0098019 | A1* | 4/2008 | Sthanikam | G06F 17/30911 |
| 2009/0150412 | A1* | 6/2009 | Idicula | G06F 17/2247 |
| 2010/0333151 | A1* | 12/2010 | Huang | 725/94 |
| 2011/0223945 | A1* | 9/2011 | Bhatnagar | 455/466 |
| 2011/0270895 | A1* | 11/2011 | Shelby | 707/803 |

OTHER PUBLICATIONS

Christensen, Erik et al., "Web Services Description Language (WSDL) 1.1," W3C Note Mar. 15, 2001, http://w3.org/TR/2001/NOTE-wsdl-20010315, 47 pages.

van Engelen, Robert et al., "The gSOAP Toolkit for Web Services and Peer-to-Peer Computing Networks," Proceedings of the 2$^{nd}$ IEEE International Symposium on Cluster Computing and the Grid (CCGrid2002), Berlin, Germany, 9 pages, May 21, 2002.

"Series X: Data Networks and Open System Communications; OSI Networking and System Aspects—Abstract Syntax Notation One (ASN.1): Specification of Basic Notation," ITU-T Recommendation X.680, International Telecommunication Union, 146 pages, Jul. 14, 2002.

Cowan, John et al., "XML Information Set (Second Edition)," W3C Recommendation Feb. 4, 2004, http://www.w3.org/TR/2004/REC-xml-infoset-20040204, 15 pages.

Booth, David et al., "Web Services Architecture," W3C Working Group Note Feb. 11, 2004, http://www.w3.org/TR/2004/NOTE-ws-arch-20040211, 1 page.

van Engelen, Robert, "Code Generation Techniques for Developing Light-Weight XML Web Services for Embedded Devices," Proceedings of the ACM SIGAPP SAC Conference, Nicosia, Cyprus, 8 pages, Mar. 14, 2004.

Sandoz, Paul et al., "Fast Infoset," http://www.oracle.com/technetwork/articles/javase/fastinfoset-139262.html, 19 pages, Jun. 2004.

Gudgin, Martin et al., "Web Services Addressing 1.0—Core," W3C Recommendation May 9, 2006, http://w3.org/TR/2006/REC-ws-addr-core-20060509, 1 page.

Perera, Srinath et al., "Axis2 Middleware for Next Generation Web Services," IEEE International Conference on Web Services, Computer Society, 8 pages, 2006.

Mitra, Nilo et al., "SOAP Version 1.2 Part 0: Primer (Second Edition)," W3C Recommendation Apr. 27, 2007, http://www.w3.org/TR/2007/REC-soap12-part0-20070427, 61 pages.

Bournez, Carine, "Efficient SML Interchange Evaluation," W3C Working Draft Apr. 7, 2009, http://www.w3.org/TR/2009/WD-exi-evaulation-20090407, 1 page.

Peintner, Daniel et al., "Efficient XML Interchange for Rich Internet Applications," ICME 2009, IEEE, 4 pages.

Schneider, John et al., "Efficient XML Interchange (EXI) Format 1.0," W3C Recommendation Mar. 10, 2011, http://www.w3.org/TR/2011/REC-exi-20110310, 126 pages.

International Search Report and Written Opinion, Application No. PCT/EP2011/056565, 12 pages, dated Jul. 7, 2011.

European Search Report, Application No. 10187130.9, 8 pages, dated Jul. 7, 2011.

Heuer, Jörg et al., "2.3 MPEG-7 Binary Format," Siemens AG, 16 pages.

Käbisch, Sebastian et al., "Efficient and Flexible XML-based Data-Exchange in Microcontroller-based Sensor Actor Networks," Siemens AG, Corporate Technology and University of Passau, 6 pages.

* cited by examiner

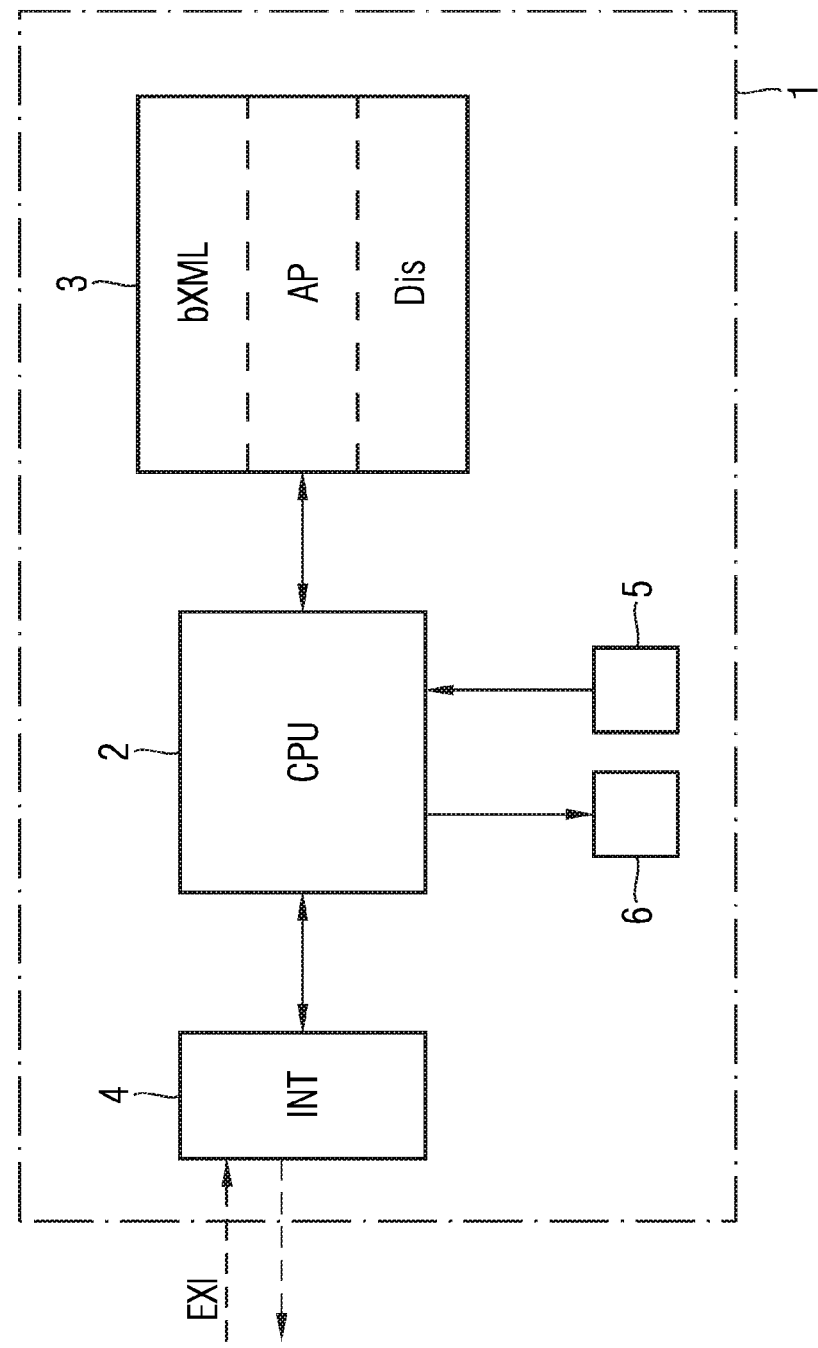

METHOD AND APPARATUS FOR PROVIDING A SERVICE IMPLEMENTATION

CROSS-REFERENCE TO RELATED APPLICATIONS

This application is a U.S. National Stage Application of International Application No. PCT/EP2011/056565 filed Apr. 26, 2011, which designates the United States of America, and claims priority to EP Patent Application No. 10005132.5 filed May 17, 2010 and EP Patent Application No. 10187130.9 Filed Oct. 11, 2010. The contents of which are hereby incorporated by reference in their entirety.

TECHNICAL FIELD

The disclosure relates to a method and an apparatus for providing a service implementation in particular providing a web service in an embedded network.

BACKGROUND

Embedded network programming remains a highly complex task for developers. The execution of application procedures in such embedded networks is inherently distributed and has to take into account restraint resources which are available in the individual network nodes. Conventionally embedded networks are typically tailored only to specific use cases that are equipped with proprietary application protocols. This conventional way of implementing embedded networks has several drawbacks. On the one hand, the development of individual programs of procedures for every single embedded network is very complex and time consuming. On the other hand, individual implementations for every single embedded network prevents the reuse of software components as well as the interoperability in between networks and in between heterogenous hardware classes.

SUMMARY

In one embodiment, a method for providing a service implementation comprises the steps of: (a) generating a XML (Extended Markup Language) schema based on a service description of said service, wherein the generated XML-based schema defines XML-based messages to be interpreted by the respective service; (b) generating a binary XML processor code for encoding and decoding said XML-based messages on the basis of the generated XML schema; (c) transforming said service description of said service into a procedure skeleton code comprising one or more skeleton procedures each becoming an application procedure by implementing an application logic for the respective skeleton procedure; and (d) generating a dispatcher code based on the service description, wherein said dispatcher code is adapted to interpret a byte stream produced by said binary XML processor code to invoke one of the implemented application procedures.

In a further embodiment, said service is formed by a web service or a REST service. In a further embodiment, said service description is formed by a WSDL (Web Service Description Language) service description file or an annotation based service description file. In a further embodiment, said XML-based messages are formed by SOAP (Service Oriented Architecture Protocol)-based messages. In a further embodiment, said XML-based schema is formed by a XML schema, a Relax NG Schema or a DTD. In a further embodiment, said binary XML processor code is formed by an EXI (Efficient XML Interchange) code or a BIM code. In a further embodiment, said service is provided for an embedded system comprising a wired or wireless network having at least one client node requesting said service and at least one server node providing the requested service. In a further embodiment, the client node and server node communicate with each other by exchanging byte streams via a wireless or wired communication link. In a further embodiment, the exchanged byte streams are EXI (Efficient XML Interchange) byte streams.

In another embodiment, a system is provided for providing a service to a client node, wherein at least one server node provides in response to a service request from said client node the requested service, wherein the nodes each have a processing unit for processing a source code stored in a local memory of the respective node, wherein said source code comprises: a binary XML code for encoding and decoding XML based messages, said binary XML code being generated based on a service description of said service, at least one application procedure code provided by transformation of the service description of said service into a skeleton procedure and by implementation of an application logic for the respective skeleton procedure, and a dispatcher code being generated based on the service description of said service, wherein the dispatcher code is adapted to interpret a byte stream received via an interface of said node to invoke one of the application procedures stored in said local memory to be executed by said processing unit of said node.

In a further embodiment, said system is an embedded system comprising nodes connected to each other via wireless or wired network links. In a further embodiment, said network links comprise ZigBee, WLAN or Bluetooth links. In a further embodiment, the node comprises at least one sensor for providing sensor data and/or at least one actor for acting in response to control data. In a further embodiment, said embedded system comprises a distributed embedded system having a plurality of nodes, wherein at least one node is a node of an industrial automation network or wherein at least one node is a node of a smart grid supply network or wherein at least one node is a node integrated in a vehicle or wherein at least one node is node of a sensor network.

In another embodiment, a code generator for generating source code of a node within a system as disclosed above, said code generator comprising: (a) means for generating a XML (Extended Markup Language) schema based on a service description of a service, wherein the generated XML-based schema defines XML-based messages to be interpreted by a service; (b) means for generating a binary XML processor code for encoding and decoding XML-based messages on the basis of the generated XML-based schema; (c) means for transforming said service description of said service into a procedure skeleton code comprising one or more skeleton procedures each becoming an application procedure by implementing an application logic for the respective skeleton procedure; and (d) means for generating a dispatcher code based on the service description, wherein said dispatcher code is adapted to interpret a byte stream produced by said binary XML processor code to invoke one of the implemented application procedures.

In another embodiment, a tool is provided for generating source code for a node of a system as disclosed above, said tool being adapted: to generate a XML (Extended Markup Language) schema based on a service description of a service, wherein the XML-schema defines XML-based messages to be interpreted by the respective service; to generate a binary XML processor code for encoding and decoding XML-based messages on the basis of the generated XML-based schema; to transform said service description of the service into a procedure skeleton code comprising one or more skeleton procedures each becoming an application procedure by implementing an application logic for the respective skeleton procedure; and to generate a dispatcher code based on the service description, wherein the dispatcher code is adapted to interpret a byte stream produced by said binary XML code to invoke one of the implemented application procedures.

BRIEF DESCRIPTION OF THE DRAWINGS

Example embodiments will be explained in more detail below with reference to figures, in which:

FIG. 3 shows a block diagram of an example node employed within a system according to one embodiment.

DETAILED DESCRIPTION

Figure 1:
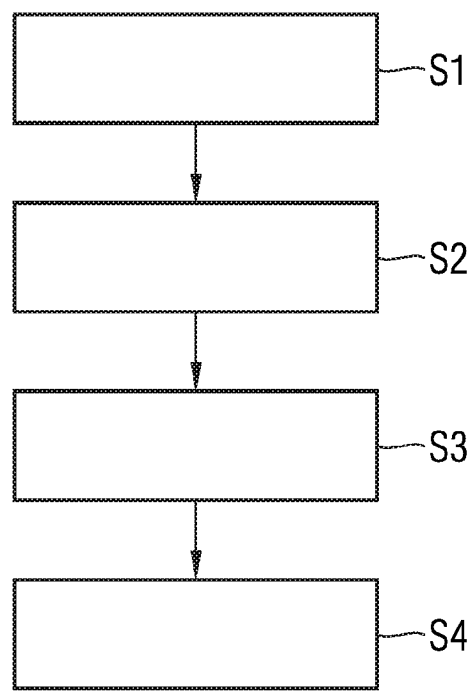
FIG. 1 shows a flowchart of an example method for providing a service implementation according to one embodiment.

Some embodiments provide a method and an apparatus allowing a service implementation with less complexity and reduced development time.

For example, some embodiments provide a method for providing a service implementation comprising the steps of:
(a) generating a XML (Extended Markup Language) schema based on a service description of said service, wherein the generated XML-schema defines XML-based messages to be interpreted by the respective service;
(b) generating a binary XML processor code for encoding and decoding said XML-based messages on the basis of the generated XML-schema;
(c) transforming said service description of said service into a procedure skeleton code comprising one or more skeleton procedures each becoming an application procedure by implementing an application logic for the respective skeleton procedure; and
(d) generating a dispatcher code based on the service description,
wherein said dispatcher code is adapted to interpret a byte stream produced by said binary XML processor code to invoke one of the implemented application procedures.

In one embodiment the implemented service is formed by a Web Service.

In an alternative embodiment the implemented service is formed by a REST (Representational State Transfer) service.

In one embodiment of the method the service description is formed by a WSDL (Web Service Description Language) service description file.

In a further embodiment of the method the service description is formed by an annotation-based service description file.

In one embodiment of the method the XML-based messages are formed by SOAP (Service Oriented Architecture Protocol)-based messages.

In one embodiment of the method the XML-based schema is formed by a XML schema, a Relax NG Schema or a DTD (Document Type Definition).

In one embodiment of the method the binary XML processor code is formed by an EXI (Efficient XML Interchange) code.

In a further embodiment of the method the binary XML processor code is formed by a BIM code.

In one embodiment of the method the web service is provided for an embedded system. This embedded system can comprise a wired or wireless network having at least one client node requesting said service and at least one server node providing the requested service. The service can be a web service or a REST service.

In one embodiment of the method the client node and server node communicate with each other by exchanging byte streams. These byte streams can be exchanged via a wireless or wired communication link.

In one embodiment of the method the exchanged byte streams are EXI (Efficient XML Interchange) byte streams.

Other embodiments provide a system for providing a service to a client node,
wherein at least one server node provides in response to a service request from the client node the requested service,
wherein the nodes each have a processing unit for processing a source code stored in a local memory of the respective node,
wherein said source code comprises:
a binary XML code for encoding and decoding XML based messages, said binary XML code being generated based on a service description of said service,
at least one application procedure code provided by transformation of the service description of said service into a skeleton procedure and by implementation of an application logic for the respective skeleton procedure, and
a dispatcher code being generated based on the service description of said service,
wherein the dispatcher code is adapted to interpret a byte stream received via an interface of said node to invoke one of the application procedures stored in said local memory to be executed by the processing unit of said node.

In one embodiment the system is an embedded system comprising nodes connected to each other via network links.

In one embodiment the network links are formed by wireless links.

In an alternative embodiment the network links are formed by wired network links.

In one embodiment of the method the network links comprise ZigBee, WLAN or Bluetooth links.

In one embodiment of the method the node can comprises at least one sensor for providing sensor data.

Further, the node may comprise at least one actor for acting in response to control data.

In one embodiment of the system, the embedded system comprises a distributed embedded system having a plurality of nodes.

In one embodiment at least one node is a node of an industrial automation network.

In a further embodiment at least one node is a node of a smart grid supply network.

In a further embodiment at least one node is a node integrated in a vehicle.

In a still further embodiment at least one node is a node of a sensor network.

Other embodiments provide a code generator for generating source code of a node within an embedded system, said code generator comprising:

(a) means for generating a XML (Extended Markup Language) schema based on a service description of a service, wherein the generated XML-based schema defines XML-based messages to be interpreted by a service;

(b) means for generating a binary XML processor code for encoding and decoding XML-based messages on the basis of the generated XML-schema;

(c) means for transforming said service description of said service into a procedure skeleton code comprising one or more skeleton procedures each becoming an application procedure by implementing an application logic for the respective skeleton procedure; and (d) means for generating a dispatcher code based on the service description, wherein said dispatcher code is adapted to interpret a byte stream produced by said binary XML processor code to invoke one of the implemented application procedures.

Other embodiments provide a tool for generating source code for a node of an embedded system, said tool being adapted:

to generate a XML (Extended Markup Language) schema based on a service description of a service, wherein the XML-based schema defines XML-messages to be interpreted by the respective web service;

to generate a binary XML processor code for encoding and decoding XML-based messages on the basis of the generated XML-schema;

to transform said service description of the service into a procedure skeleton node comprising one or more skeleton procedures each becoming an application procedure by implementing an application logic for the respective skeleton procedure; and to generate a dispatcher code based on the service description, wherein the dispatcher code is adapted to interpret a byte stream produced by said binary XML code to invoke one of the implemented application procedures.

As can be seen from FIG. 1 in a possible embodiment the method for providing a service implementation comprises several steps S1 to S4.

In a first step S1 a XML (Extended Markup Language) schema is generated based on a service description of the service. In a possible embodiment the service is a web service. The generated XML-based schema defines XML-based messages to be interpreted by the respective service. In a possible embodiment the service description is formed by a WSDL (Web Service Description Language) service description file. In a further possible embodiment the service description is formed by an annotation based service description file. The XML-schema generated in step S1 defines XML-based messages to be interpreted by the respective service. The XML-based messages can be formed by SOAP (Service Oriented Architecture Protocol) based messages.

In a further step S2 a binary XML processor code is generated for encoding and decoding the XML-based messages on the basis of the generated XML-schema.

Figure 2:
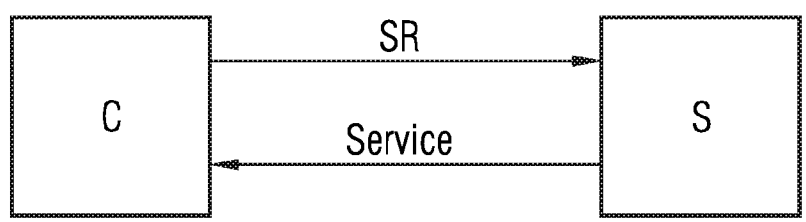
FIG. 2 shows a diagram for illustrating an example method according to one embodiment.

In a further step S3 the service description of the services is transformed in a procedure skeleton code comprising one or more skeleton procedures each becoming an application procedure by implementing an application logic for the respective skeleton procedure. In a further step S4 a dispatcher code is generated based on the service description, e.g. based on a WSDL service description. The generated dispatcher code is adapted to interpret a byte stream produced by the binary XML processor code to invoke one of the implemented application procedures. In a possible embodiment the binary XML processor code can be formed by an EXI (XML interchange) code. In a further possible embodiment the binary XML processor code can be formed by a BIM code (Binary MPEG format for XML). Further, the service implemented by the method as shown in FIG. 1 is provided for an embedded system. This embedded system can comprise a wired or wireless network having at least one client node requesting a service and at least one server node providing the requested service to the requesting client. The client node and server node can communicate with each by exchanging byte streams via a wireless or wired communication link as also illustrated in FIG. 2. The client node C sends a service request SR to a server nodes which provides the requested service to the client node C. The exchange byte streams between the nodes can be EXI (Efficient XML Interchange) byte streams.

FIG. 3 shows a block diagram of a possible embodiment of a node 1 which can be used in a system for providing a service. The node 1 as shown in FIG. 3 can form a client node or a server node of a network within an embedded system. As can be seen in FIG. 3 the node 1 comprises a processing unit 2 for processing a source code stored in a local memory 3 of the node 1. The processing unit 2 can be formed by a microcontroller for executing source code loaded from the local memory 3. The local memory 3 of node 1 comprises binary XML code for encoding and decoding XML-based messages as well as at least one application procedure code and a dispatcher code. The binary XML code bXML in the local memory 3 is generated based on a service description of the respective service. The application procedure code AP is provided by transformation of the service description of the respective service into a skeleton procedure and by implementation of an application logic for the respective skeleton procedure. The dispatcher code is also generated based on the service description of the respective service. The service description can be a WSDL service description loaded from a file. The dispatcher code stored in the local memory 3 is adapted to interpret a byte stream received via an interface 4 of the node 1 to invoke one of the application procedures AP stored in the local memory 3 to be executed by the processing unit 2 of the node 1. The interface 4 of the node 1 can communicate with other nodes of a network of the embedded system via a data link. The data link can be a wireless but also a wired network link. In a possible embodiment the network link comprises a ZigBee link. In an alternative embodiment the network links can comprise WLAN or Bluetooth links. In a possible embodiment the node 1 of the embedded system comprises at least one sensor 5 providing sensor data which are computed and evaluated by the processing unit 2. Furthermore the node 1 can comprise an actor 6 acting in response to control data applied by the processing unit 2.

The node 1 as shown in FIG. 3 can form a node of an automation network. Further, the node 1 can be a node of a smart grid supply network or can be integrated in a vehicle. In a further possible embodiment the node 1 forms a node of a distributed sensor network.

The source code SC stored in the local memory 3 can be generated by a code generator. In a possible embodiment the generated source code comprises the binary XML code, at least one application procedure code AP and a dispatcher code as shown in FIG. 3. The generated source code SC generated by the code generator can in a possible embodiment be loaded to the local memory 3 by means of the interface 4 of node 1. In a further embodiment a separate interface is provided for loading the generated source code SC to the local memory 3 of node 1. In a still further possible embodiment the local memory 3 comprising the generated source code SC can be inserted with a chip in a socket connecting in the inserted memory 3 to the processing unit 2. In a possible embodiment the source code SC is generated by a program tool executed by a computer wherein the tool generates the XML schema based on the service description of the respective service and which generates on the basis of the XML-schema the binary XML processor code for encoding and decoding XML-based messages. The tool further transforms the service description of the respective service to a procedure skeleton code comprising one or more skeleton procedures. The skeleton procedures are transformed into application procedures by implementing an application logic for the respective skeleton procedure. Furthermore, the tool generates a dispatcher code based on the service description. The generated dispatcher code is adapted to interpret a byte stream produced by the generated binary XML code to invoke one of the implemented application procedures. Accordingly, the code generator is in a possible embodiment a XML-based web service generator providing a source code for a processing unit which processes the generated source code comprising a dispatcher code to interpret an EXI byte stream. This enables the efficient usage of XML-based messages such as SOAP (Service Oriented Architecture Protocol) based messages. An automatized workflow of the service generator for microcontrollers can be divided into two main phases, i.e. a first phase wherein based on a given service description schema information is generated that describes all possible messages which can be understood and interpreted by the respective service. In a second phase source codes are generated which contain the EXI processor, RPC skeletons and a dispatcher that handles the request and response messages.

Accordingly, the disclosed method and system may provide the benefit that based on a prior defined WSDL document the generator can produce the source code SC with the mechanism to process and interpret a SOAP-based message. A further advantage is that developers do not need to investigate in request/response mechanisms or in efficient message representations and its processing. Furthermore, the disclosed method and system may enable a schemeless adoption and usage of standardized web service protocols in microcontroller-based networks. Accordingly, the disclosed method and system may simplify the integration of web services in an embedded environment.

The disclosed method and system according to the present may be used for embedded sensor actor networks. Further, the disclosed method and system may be used for any kind of embedded networks which typically contain a multitude of nodes with a broad range of different capabilities such as sensing, acting and processing. These kind of networks are gaining increasing importance e.g. in process and building automation, e.g. to optimize processors and to facilitate energy management.

A web service implemented by the disclosed method may be a software system designed to support interoperable machine to machine interaction over a network. The interface can be described in a machine processable format provided for example by the web service description language WSDL. The transport independent SOAP is an exchange message protocol which can be used to interact with other systems. Inherent interoperability that comes with using platform and language independent XML-based protocols has as a consequence that any application procedure can communicate with any other application procedure using web services. To effectively exchange information data via SOAP with a particular service a client only requires the WSDL that describes the service's end point location, its remote methods and the type of parameter data which is used. None of the involved nodes needs information how another node is implemented or in what format its underlying data is stored. These standards allow developers to integrate application procedures running on disparate systems and data structures with relative ease.

The efficient XML interchange EXI format represents a compact representation for an XML information data set, which optimizes performance and utilization of computational resources. The EXI format employed by the disclosed method uses a grammar driven approach that achieves efficient encodings for a broad range of use cases. EXI specification defines a predefined process how schema information is to be transformed to EXI grammars. The reason for doing so is that EXI grammars are simpler to process compared to XML schema information, while still describing in an accurate way what is expected to occur at any given point or node within the network. Analysing of XML schema information provides all possible XML elements, attributes and constraints in a specific schema context. Based on the domain specific functionalities and data types EXI grammars can be generated. The generated EXI grammars can form the basis for creating or generating a source code and implicitly an EXI processor. This results as an EXI processor with minimal code foot print and complexity where the runable code implicitly contains all required grammar information without any external dependencies. This resulting processing unit is able to encode the schema equivalent XML information represented as data structure in memory to an EXI stream. The EXI stream or respective the XML information items can be unmarshaled to a data structure again. Based on the capability to build a compact EXI processor one can generate an XML-based web service which can run on a small embedded device.

In a possible embodiment based on a WSDL service description an XML schema (service SOAP XSD) is generated that defines all possible SOAP messages which the service can handle. The service SOAP XSD declares the typical SOAP message framework that includes the (optional) header and the body elements which are declared bested within the envelope element declaration. The content of the header body refers to the definitions of the XML schema which was extracted from the input WSDL (service WSDL XSD). The schema generation phase can also take further web services protocols such as WS-addressing into account if they are enabled within the WSDL description and affect the SOAP message structure. The schema of the protocol is then provided and can also be referenced from the service SOAP XSD.

In a further phase a source code generation can be performed wherein in this phase the web services source code is produced which can be used by the developpers for their respective applications. The generated source code can comprise the binary XML processor code, at least one application procedure code and a dispatcher code.

The following listing sketches a dispatcher code which shows exemplary the interaction of different generated code fragments based on a service which provides two RPCs, i.e. get Temperature and getState.

```
// SOAP structures for request and response
Envelope soapIn, soapOut;
// map EXI stream to SOAP data structure
```

-continued

```
soapIn = readEXIDocument (in Stream);
//determine which RPC has to be invoked
if (soapIn.Envelope.body.getTempareture!=NULL)
{
//determine parameter for the RPC
byte tempScale=
soapIn.Envelope.body.getTemperature.tempScale;
//invoke RPC
float res = getTemperature(tempScale);
//prepare response message and assign result value
soapOut.Envelope.body.getTemperatureResponse.res=res;
{
else if(soapIn.Envelope.body.getState!=NULL)
{
//it's a state request...
{
//encode response message to an EXI stream and
//return it
return EXIDocument writeEXIDocument(soapOut);
}
```

In the given example the passed byte stream streamIn can be dispatched from the transportation stack which represents the SOAP-based request message is decoded and mapped to an Envelope data structure instance soapIn by the EXI processor (read EXI Document). After that it is determined which RPC has to be called. In the case of the initialization of the get temperature field within the envelope data structure the scale temperature the tempScale (Celsius/Fahrenheit) is determined and passed to the generated get temperature ( )method to determine the current temperature values (res). This result value is used to initialize the get temperature response in the response message. This also signalizes the kind of RPC response, the SOAP information set as SoapOut is encoded to an EXI stream send Buffer which can be sent back to the service requester.

Accordingly, the present disclosure presents an innovative approach to generate a source code for developing XML-based web services for small embedded devices with constraint resources. The generator enables the schemeless adoption and usage of standardized web service protocols in microcontrol based networks. This makes the development of applications of such networks much easier and also simplifies the integration of web service of other networks. The generated XML-based web service comprises a very low code footprint to be executed with microcontrollers.

What is claimed is:

1. A computer-implemented method for providing a web service implementation for an embedded system comprising a wired or wireless network having at least one client node requesting the web service and at least one server node providing the requested service to the requesting client node, comprising:
   (a) generating an XML (Extended Markup Language) schema based on a service description of said service, wherein the service description is formed by a WSDL service description file or an annotation based service description file, and wherein the generated XML schema defines XML-based messages to be interpreted by the web service;
   (b) generating a binary XML processor code for encoding and decoding the XML-based messages on the basis of the generated XML schema, wherein the binary XML code is formed by an EXI (XML interchange) code or a BIM (Binary MPEG format for SML) code;
   (c) transforming said service description of said service into a procedure skeleton code comprising one or more skeleton procedures each becoming an application procedure by implementing an application logic for the respective skeleton procedure; and
   (d) generating a dispatcher code based on the service description, wherein said dispatcher code is configured to interpret a byte stream produced by said binary XML processor code to invoke one of the implemented application procedures.

2. The method according to claim 1, wherein said service is formed by a web service or a REST (Representational State Transfer) service.

3. The method according to claim 1, wherein said service description is formed by a WSDL (Web Service Description Language) service description file or an annotation based service description file.

4. The method according to claim 1, wherein said XML-based messages are formed by SOAP (Service Oriented Architecture Protocol)-based messages.

5. The method according to claim 1, wherein said XML-based schema is formed by a XML schema, a Relax NG (Regular language for XML Next Generation) Schema or a DTD (Document Type Definition).

6. The method according to claim 1, wherein said binary XML processor code is formed by an EXI (Efficient XML Interchange) code or a BIM (Binary MPEG format for XML) code.

7. The method according to claim 1, wherein said service is provided for an embedded system comprising a wired or wireless network having at least one client node requesting said service and at least one server node providing the requested service.

8. The method according to claim 7, wherein the client node and server node communicate with each other by exchanging byte streams via a wireless or wired communication link.

9. The method according to claim 8, wherein the exchanged byte streams are EXI (Efficient XML Interchange) byte streams.

10. A system for providing a service to a client node,
    wherein at least one server node provides in response to a service request from said client node the requested service,
    wherein the nodes each have a processing unit for processing a source code stored in a non-transitory local memory device of the respective node, wherein said source code comprises:
    a binary XML code for encoding and decoding XML based messages, said binary XML code being generated based on a service description of said service,
    at least one application procedure code provided by transformation of the service description of said service into a skeleton procedure and by implementation of an application logic for the respective skeleton procedure, and
    a dispatcher code being generated based on the service description of said service,
    wherein the dispatcher code is configured to interpret a byte stream received via an interface of said node to invoke one of the application procedures stored in said local memory to be executed by said processing unit of said node.

11. The system according to claim 10, wherein said system is an embedded system comprising nodes connected to each other via wireless or wired network links.

12. The system according to claim 11, wherein said network links comprise ZigBee, WLAN or Bluetooth links.

13. The system according to claim 10, wherein the node comprises at least one of:
(a) at least one sensor for providing sensor data and
(b) at least one actor for acting in response to control data.

14. The system according to claim 10, wherein said embedded system comprises a distributed embedded system having a plurality of nodes,
wherein at least one node is a node of an industrial automation network, or
wherein at least one node is a node of a smart grid supply network, or
wherein at least one node is a node integrated in a vehicle, or
wherein at least one node is node of a sensor network.

15. A tool for generating source code for a node of a system, said tool comprising logic instructions embodied in non-transitory computer-readable media and executable to:

generate an XML (Extended Markup Language) schema based on a service description of a service, wherein the XML schema defines XML-based messages to be interpreted by the respective service;
generate a binary XML processor code for encoding and decoding the XML-based messages on the basis of the generated XML schema;
transform said service description of the service into a procedure skeleton code comprising one or more skeleton procedures each becoming an application procedure by implementing an application logic for the respective skeleton procedure; and
generate a dispatcher code based on the service description,
wherein the dispatcher code is configured to interpret a byte stream produced by said binary XML code to invoke one of the implemented application procedures.

* * * * *